Nov. 22, 1938.    B. J. SADOFF    2,137,901
SAUSAGE PATTY MACHINE
Filed Feb. 2, 1937
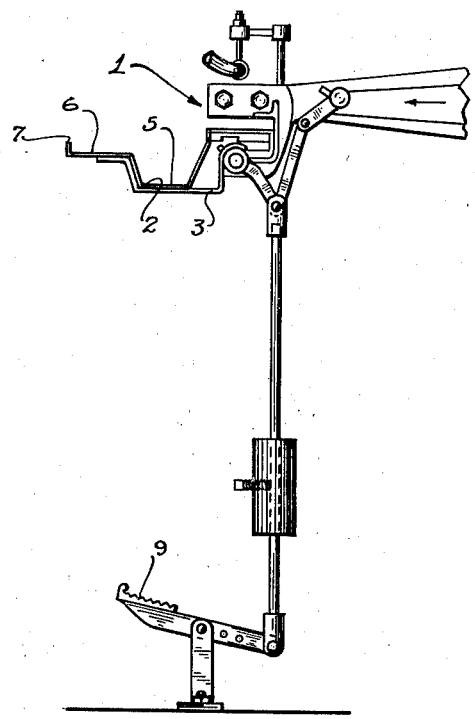
Fig. 1
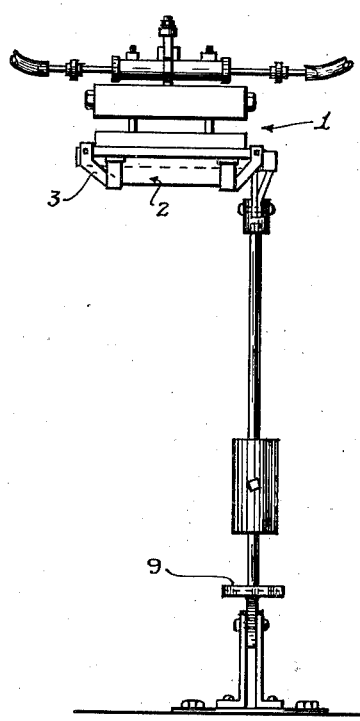
Fig. 2
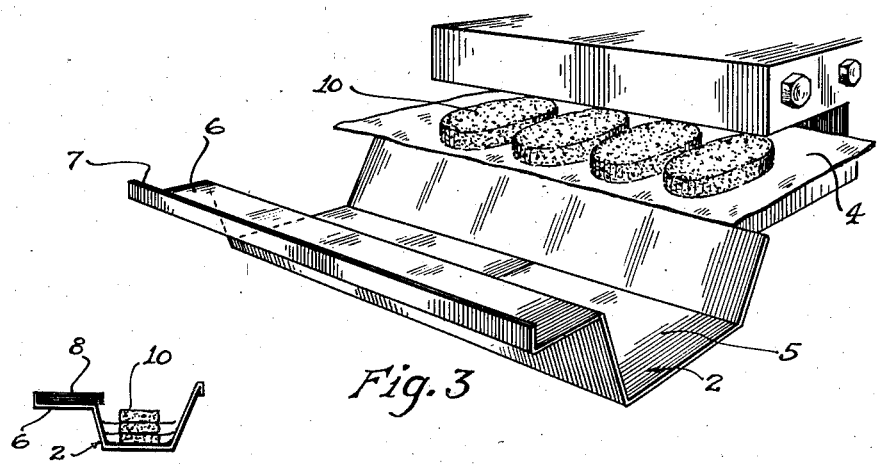
Fig. 3
Fig. 4
ATTEST:
Wm. C. Meiser
Bernard J. Sadoff
INVENTOR
BY
ATTORNEY Patented Nov. 22, 1938

2,137,901

UNITED STATES PATENT OFFICE 2,137,901

SAUSAGE PATTY MACHINE

Bernard J. Sadoff, Buenos Aires, Argentina, assignor to Industrial Patents Corporation, Chicago, Ill., a corporation of Delaware Application February 2, 1937, Serial No. 123,699

3 Claims. (Cl. 107—8)

This invention relates to an improved sausage patty machine.

One of the objects of this invention is to provide an attachment for sausage patty machines.

Another object of the invention is to provide auxiliary means which may be employed in the operation of a machine such as is described and claimed in United States Patent No. 1,550,617 to George J. Kellerman.

Another object of the invention is to provide an improved sausage patty forming machine.

Other objects of the invention will be apparent from the description and claims which follow.

In the drawing, similar reference characters in the several figures indicate similar elements.

Figure 1 is a side view of a preferred embodiment of the present invention as applied to the forming portion of a Kellerman sausage patty machine.

Figure 2 is a front view of Figure 1.

Figure 3 is an enlarged view, in perspective, of the improved shelf of the present invention.

Figure 4 is a side view of the shelf shown in Figure 3.

In a sausage patty machine of the Kellerman type a sausage meat under pressure is delivered to forming elements in the preparation of sausage patties. With such a machine a piece of parchment paper is placed in a position to receive a group of formed patties. The forming device is operated by a hand lever which forms a plurality of patties on the sheet of paper. It is a customary practice to form four patties in a group.

I have found that the operation of such a machine involves considerable time and manual effort. It is the purpose of the present invention to increase the efficiency of the operator and of the machine.

I have found in practice that the present invention increases the efficiency of both operator and machine by approximately 40 per cent.

The present invention involves what may be termed a two step shelf attached to the forming horn 1 of a sausage patty machine. The shelf 2 may be supported by brackets 3, adjacent forming anvil 4 of the sausage patty machine. Platform 5 is situated below anvil 4 to receive the formed patties. Intergral therewith and above platform 5 is platform 6 adapted to hold a supply of paper slips 8. Platform 6 is provided with integral flange 7.

In operation, the pile of paper slips is placed on platform 6 as shown in Figure 4. The operator picks up a slip of paper from the pile 8 on platform 6 and places the slip of paper on anvil 4 in the forming horn 1. The operator then depresses foot pedal 9 to actuate the forming horn, forming patties 10 on paper slips 11. The formed patties 10 with the supporting sheet of paper are placed upon platform 5 as shown in Figure 4. When a sufficient quantity of charged papers is accumulated on platform 5, the group may be removed as by sliding to an adjacent packing table.

It will be apparent that the present invention greatly increases the efficiency of a sausage patty machine by permitting constant, efficient use of the operator's hands. It will be understood that details of the present invention may be altered without departure from the spirit thereof, as explained in the claims which follow.

I claim:

1. An attachment for a sausage patty forming machine of the type having a forming horn comprising a shelf, including a paper platform positioned substantially opposite the forming horn, and a receiving platform positioned between and below said paper platform and said forming horn.

2. An attachment for a sausage patty machine of the type having a forming horn and a patty forming anvil comprising a shelf including two platforms, a paper holding platform, and a formed patty receiving platform, the patty receiving platform being positioned between the patty forming anvil and the paper holding platform and relatively lower than the patty forming anvil and the paper holding platform, the paper holding platform at its outer edge being provided with an integral flange formed substantially at a right angle thereto.

3. In combination with a sausage patty machine comprising a forming horn, foot operated means to actuate the forming horn and a patty forming anvil, a paper holding platform, and a formed patty receiving platform, the receiving platform being positioned between and below the forming anvil and the paper holding platform.

BERNARD J. SADOFF.